US007831931B2

(12) United States Patent
Klein et al.

(10) Patent No.: US 7,831,931 B2
(45) Date of Patent: Nov. 9, 2010

(54) SUCCESSIVELY DISPLAYING PANELS IN A COMPUTER USER INTERFACE

(75) Inventors: Udo Klein, Maximiliansau (DE); Uwe Klinger, Bad Schoenborn (DE); Martin Scholz, Nussloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1874 days.

(21) Appl. No.: 10/675,919

(22) Filed: Sep. 30, 2003

(65) Prior Publication Data

US 2005/0071784 A1 Mar. 31, 2005

(51) Int. Cl.
*G06F 3/048* (2006.01)
(52) U.S. Cl. .................. 715/854; 715/744; 715/745; 715/777; 715/789; 715/853; 715/855; 715/866
(58) Field of Classification Search .......... 715/744, 715/745, 777, 789, 853–855, 8, 866
See application file for complete search history.

(56) References Cited

U.S. PATENT DOCUMENTS

| 5,072,412 | A  | * | 12/1991 | Henderson et al. | 715/804 |
|-----------|----|---|---------|------------------|---------|
| 6,243,088 | B1 | * | 6/2001  | McCormack et al. | 715/866 |
| 6,341,359 | B1 | * | 1/2002  | Aiken et al.     | 714/100 |
| 6,675,193 | B1 | * | 1/2004  | Slavin et al.    | 709/200 |
| 2003/0137539 | A1 |   | 7/2003  | Dees             |         |
| 2005/0010877 | A1 | * | 1/2005  | Udler            | 715/826 |

FOREIGN PATENT DOCUMENTS

GB          2362485          11/2001

OTHER PUBLICATIONS

Microsoft, "How to: View Previously-Opened Folders When You Log on to Windows XP", Oct. 26, 2002, http://support.microsoft.com/?kbid=320168.*
Herder "Metrics for the Adaptation of Site Structure," *Proceedings of the German Workshop on Adaptivity and User Modeling in Interactive Systems*, obtained from the Internet at http://citeseer.ist.psu.edu/cache/papers/cs/26914/http:zszzszwwwhome.cs.utwente.n1zsz{herderzszin formaticazszaiozszpaperszszmetrics _ for _ the _adaptation_of_ site_structure.pdf/herder02metrics.pdf> on Apr. 18, 2005.
Screen snapshot of the "Siebel 7" product from Siebel Systems.
Screen snapshot of the "Siebel ERM" product from Siebel Systems.
http://www.goodwill.co.jp/oldmac/prototypes.html—"A Pictorial History of the "Apple Desktop Interface"1979-2000," printed from the Internet on Oct. 13, 2003, 4 pages.

\* cited by examiner

*Primary Examiner*—Alvin H Tan
(74) *Attorney, Agent, or Firm*—Fish & Richardson P.C.

(57) ABSTRACT

Successively displaying panels in a computer user interface. A method includes displaying a first panel of a plurality of panels. Each of the panels includes different information. The computer user interface has a plurality of navigation controls by which a user can navigate to any of the panels to access its information. A first setting of the navigation controls causes the first panel to be displayed. A user input requesting access to a second panel is received, there being at least two settings of the navigation controls that will cause the second panel to be displayed. The method includes ceasing to display the first panel and displaying the second panel using one of the at least two different settings by which more of the navigation controls remain unchanged from the first setting. Methods may be used in hierarchies and in arrangements that do not form trees.

18 Claims, 6 Drawing Sheets

SUCCESSIVELY DISPLAYING PANELS IN A COMPUTER USER INTERFACE

TECHNICAL FIELD

The invention relates to computer user interfaces that successively display panels.

BACKGROUND

Many user interfaces allow users to review or enter data on a number of different panels. In the more flexible systems, the user may navigate back and forth between panels at will to review, edit and enter data without having to proceed in a predetermined order. As the user is entering data, some systems verify the consistency of data that the user has entered. Such data evaluation may prompt one or more messages to be displayed, informing the user that the entered data is in error or that it has been accepted, for example. When messages relating to entered data are displayed, it may be useful to provide a link that takes the user back to an earlier panel where the data was entered.

There may, however, be more than one path in the user interface for getting to the earlier panel. In addition, the earlier panel may have content that depends on the particular path taken, so that its appearance differs if one or the other path is used. For example, the earlier panel may have tool bars, tab sets, icon strips, portal features, or other content that is tied to the path taken to reach the panel. Accordingly, the decision which path to take may matter to the user if it affects the appearance of the earlier panel.

Moreover, it may be undesirable to always use the "original" path; that is, the path that the user initially took to the earlier panel. First, if the user navigates through a number of panels after entering the data, it is possible that the content of the current panel (such as framing or toolbars) will change substantially if the "original" path is taken to the earlier panel. Second, the system may not "remember" what the original navigation path was, if this information is not stored persistently within the system.

SUMMARY

The invention relates to successively displaying panels in a computer user interface.

In a first general aspect, the invention provides a method of successively displaying panels in a computer user interface. The method comprises displaying a first panel of a plurality of panels in a computer user interface. Each of the panels includes different information and the computer user interface has a plurality of navigation controls by which a user can navigate to any one of the panels to access its information. A first setting of the navigation controls causes the first panel to be displayed. A user input requesting access to information on a second panel in the computer user interface is received, there being at least two different settings of the navigation controls that will cause the second panel to be displayed. The method comprises ceasing to display the first panel and displaying the second panel using one of the at least two different settings by which more of the navigation controls remain unchanged from the first setting.

In selected embodiments, the panels may be arranged in a hierarchy comprising nodes. The path taken to the second panel may then be the one having a lowest common node with the path taken to the first panel.

In selected embodiments, a message is displayed that relates to data entered on the second panel before the first panel was displayed. The message may have been prompted by an analysis of the entered data. The message may contain a link to the second panel, wherein activating the link triggers a determination of which of the at least two paths to the second panel is most similar to the path taken to the first panel.

In selected embodiments, the panels may be arranged in a system that does not form a tree. The path taken to the second panel may then be the one that has a common node with the path to the first panel that is nearest the first panel.

In a second general aspect, the invention provides a computer program product containing executable instructions. When executed, the instructions cause a processor to:

display a first panel of a plurality of panels in a computer user interface, each of the panels including different information and the computer user interface having a plurality of navigation controls by which a user can navigate to any one of the panels to access its information, wherein a first setting of the navigation controls causes the first panel to be displayed;

receive a user input requesting access to information on a second panel in the computer user interface, there being at least two different settings of the navigation controls that will cause the second panel to be displayed; and cease to display the first panel and display the second panel using one of the at least two different settings by which more of the navigation controls remain unchanged from the first setting.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers in the various drawings indicate like elements.

DETAILED DESCRIPTION

Figure 1:
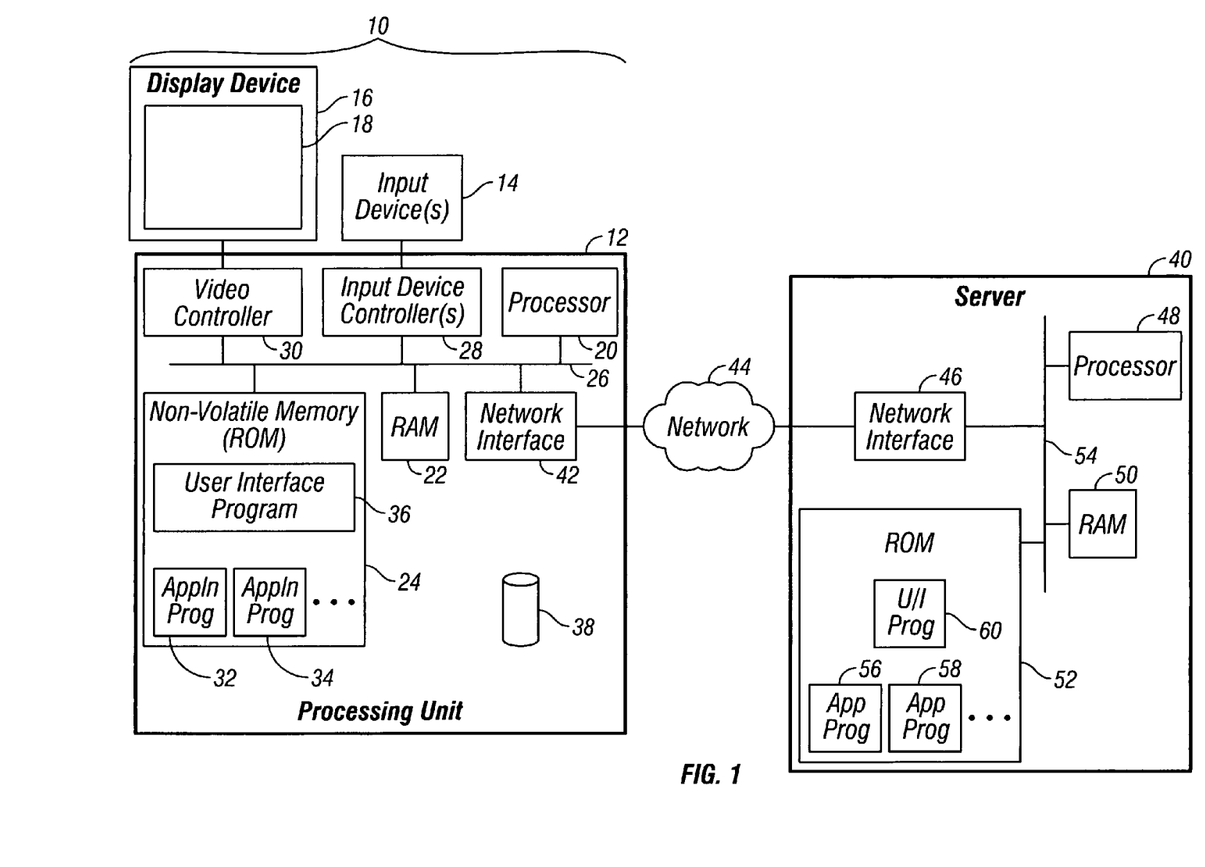
FIG. 1 is a block diagram of a computer system capable of successively displaying panels.

A computer system 10, shown in FIG. 1, includes a processing unit 12, one or more input devices 14, and a display device 16 that may present displays to a user. The display device 16 has a screen 18 upon which the displays may appear. The system 10 is capable of presenting a user interface with successively displayed panels on the display device 16 as will be described below.

The processing unit 12 includes a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The computer system 10 is not limited to a personal computer, but could instead include a personal digital assistant, a terminal, a workstation, or other such device.

ROM 24, as is conventional, may provide non-volatile data storage for various application programs 32, 34, etc. Programs 32 and 34 have program instructions that may be loaded into RAM 22 during operation. Processor 20 may then execute the program instructions, as required, to perform particular program functions. Also stored in ROM 24 is a user interface program 36 that may be designed to work in concert with each of the application programs 32, 34, etc. This is conceptually depicted in FIG. 1 by the user interface program 36 being shown as a layer on top of the application programs 32, 34, etc.

With such a design, user interface program modules common to several application programs need not be duplicated in each of the application programs. In addition, such a design may enable a common "look-and-feel" to the user interface for the different program applications 32, 34, etc. The user interface program 36 may create a display in accordance with the invention to be presented to a user on screen 18 of display device 16. The user may interact with the display by providing input using an input device 14, such as a mouse, keyboard, light pen, touchpad, joystick, etc. The user interface program 36 may use the received input to take appropriate actions, such as updating the display, creating a new display, interacting with applications programs 32 and/or 34, accessing a database 38, or accessing server 40 (described below), to list just a few examples. In other implementations, the user interface program 36 need not be a common program or module for more than one program application. Also, the components just described could be combined or separated in various manners, and could be stored in various manners, such as on various non-volatile storage medium.

Also shown in FIG. 1 is server 40. The computer system 10 may access server 40 to run applications residing on the server 40. The computer system 10 may do so by using a network interface 42 connected to its data bus 26 to access a network 44. Network 44 may be, for example, a local area network (LAN), wide area network (WAN), or a network that allows the computer system 10 and the server 40 to be part of the Internet. As is conventional, the server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, etc., as well as a common user interface program 60 for the application programs 56, 58, etc. User interface program 60 may operate similarly to user interface program 36. Any of the entities described above in the server ROM 52 could alternatively be located in a separate server, database, or computer system.

Figure 2:
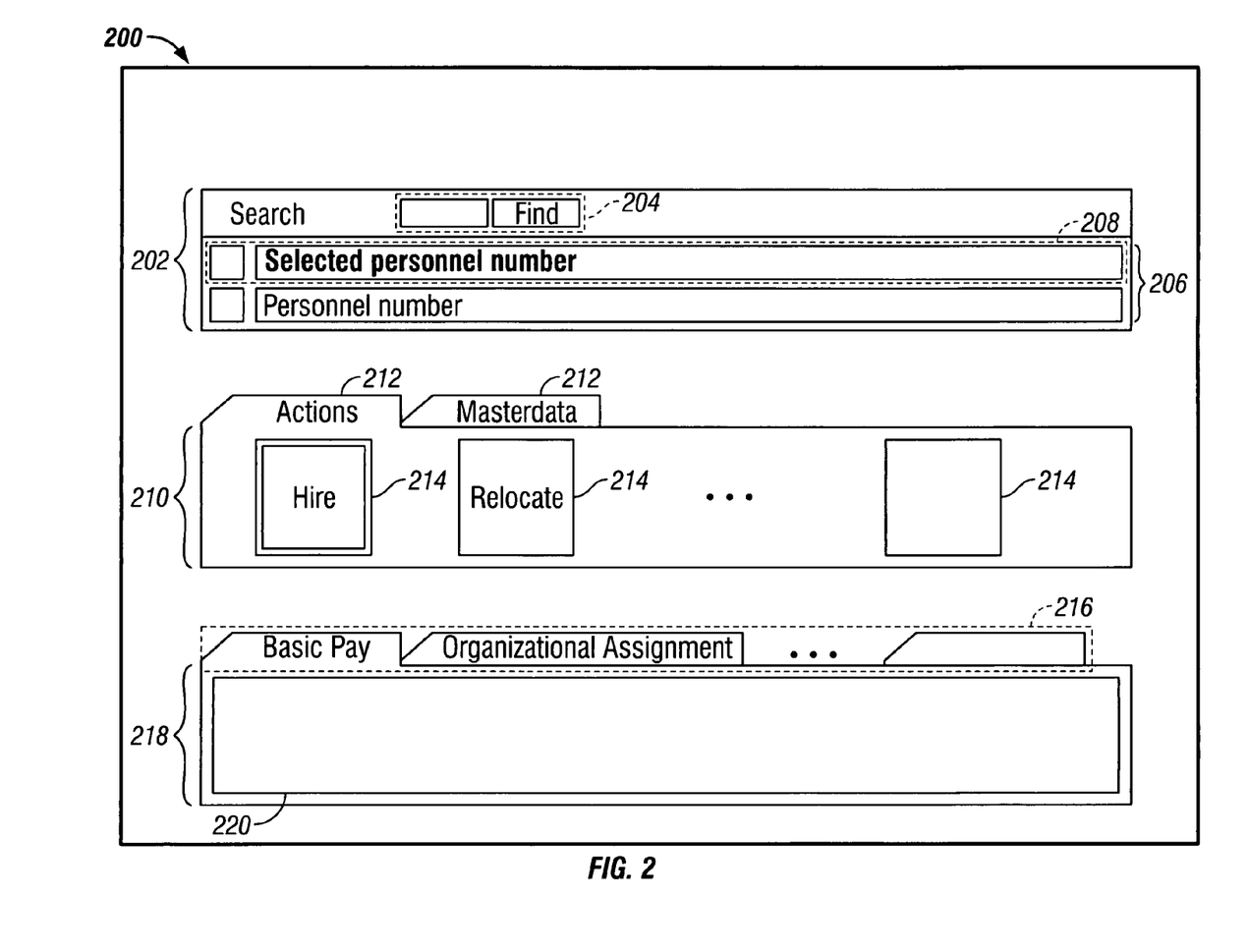
FIG. 2 schematically shows a user interface that is capable of successively displaying panels.

FIG. 2 shows an exemplary user interface 200 that can be displayed by the user interface program 36 or 60. As an example, the user interface 200 may relate to personnel administration in an organization. In such an example, the user interface 200 may be presented by a system for managing human resources records such that users can enter, edit or review data relating to particular employees. It will be understood that user interfaces relating to any other kind of data may be used in other embodiments.

The user interface 200 may include several navigation controls by which a user can navigate as will be described. An object search and display area 202 at the top of the user interface 200 allows the user to search for objects using various search tools. An illustrative search mechanism 204 in the object search and display area 202 includes a character entry field and a "Find" button for executing a search for objects matching the entered character(s). Other search mechanisms may also be used.

The area 202 also displays objects that are found in searches. The objects 206 may be the results of a query run through the search mechanism 204. In this example, objects 206 represent employees of an organization that can be identified by unique personnel numbers. Thus, selecting one of the objects 206 gives access to information about an employee having a particular employee number. Selecting one of the employees 206—here, an object 208 labeled "Selected personnel number"—triggers display of the following information in the user interface 200.

A tab set selection area 210 located under the object search and display area 202 allows the user to select between sets of tabs 212 providing alternatives for reviewing, entering or editing data pertaining to the selected employee. The tab set selection area 210 may be used to select different tab set selection tabs 212 which, in turn, control the display of tab panels 218 at the bottom of user interface 200 to be described later. Particularly, the user may click on any of the tab set selection tabs 212 to choose between categories of tab set icons 214. The currently selected tab set selection tab "Actions" is associated with the particular tab set icons 214 displayed in the tab set selection area 210. While three tab set icons 214 are shown in this example, other numbers of tab set icons may be used in other embodiments.

In this example, the "Actions" tab set selection tab 212 is associated with taking particular actions with regard to the recorded data of the selected employee. For example, two of the tab icons 214 are labeled "Hire" (currently the selected icon) and "Relocate", respectively. As their labels indicate, these tab set icons may be used when employees are hired, and relocated within the organization, respectively. In contrast, choosing the "Masterdata" tab set selection tab 212 is associated with viewing particular sections of the recorded data for the employee.

Performing actions on an employee record, such as relocating the employee from one job position within the organization to another, requires access to master data for the employee. Moreover, certain actions may require access to a number of different sections of master data for the employee. This data is made accessible to the user through panels 218 under either of the tab set selection tabs 212, as will be described below. Accordingly, a particular tab panel 218 may be accessible as master data or as part of performing a particular action on the selected employee. In other words, one or more of the panels 218 may be accessible under more than one of the tab set selection tabs 212. Similarly, a panel 218 may be accessible under more than one of the tab set icons 214.

Clicking on one of the tab set icons 214 will display a set of tabs 216. Each of the tabs 216 is associated with a panel 218. For example, a tab "Basic Pay" among the tabs 216 is currently selected, which causes tab panel 218 to be displayed with "Basic Pay" content 220, which may include text fields, graphics, input fields, and combinations thereof. A different one of the tabs 216 will have different content than the "Basic Pay" content 220.

The following is an example of how a system can successively display panels. Assume that the user is reviewing and editing data in the "Basic Pay" tab 216 using the input functions of "Basic Pay" content 220. The system 10 receives the input data through input devices 14. When the user is finished with the "Basic Pay" tab 216, the user may navigate to other of the panels 218 by selecting a different tab 216, a different tab set icon 214, or a different tab set selection tab 212.

Figure 3:
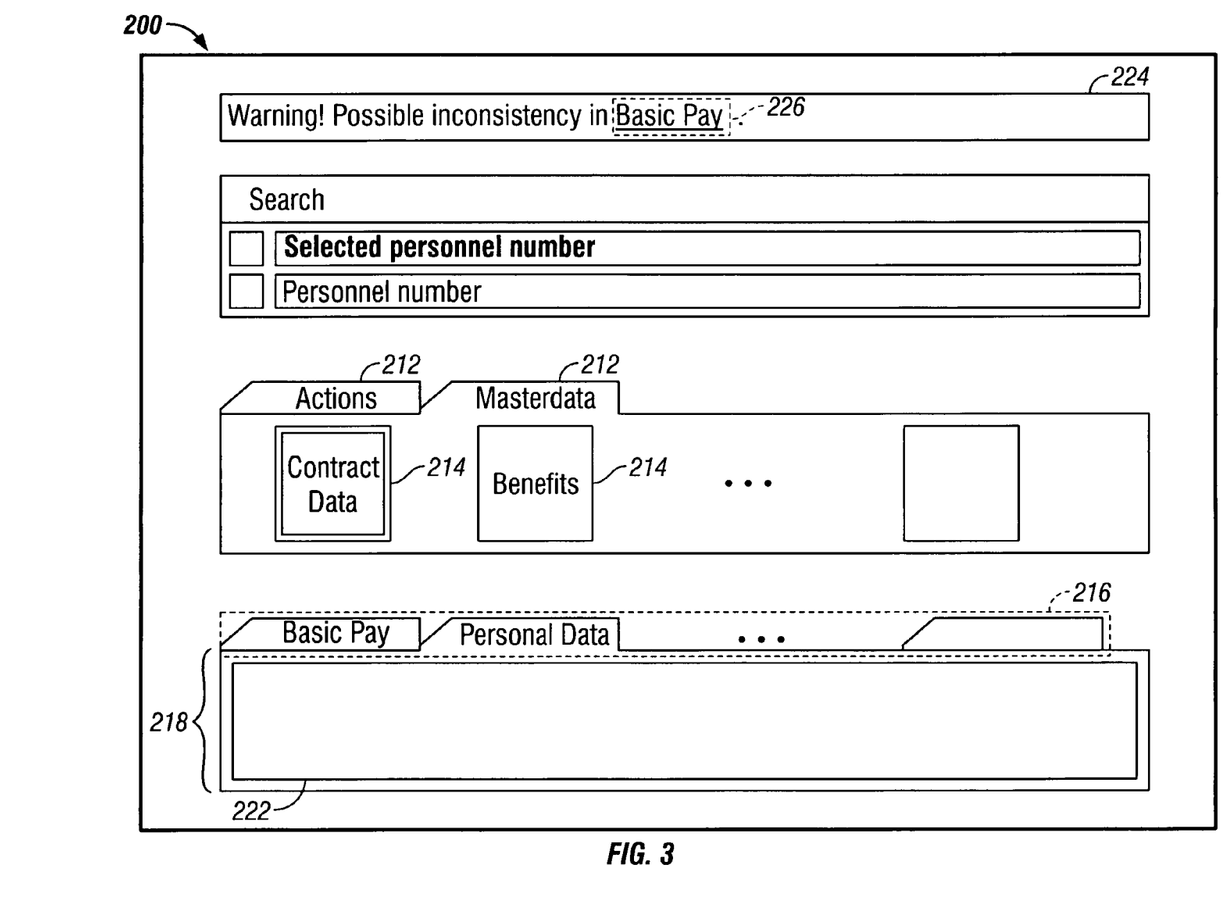
FIGS. 3 and 4 schematically shows other views of the user interface in FIG. 2.

In this example, the user selects the "Masterdata" tab set selection tab 212 and the resulting user interface 200 is shown in FIG. 3. The tab set selection tab "Masterdata" 212 has a different set of tab set icons 214 than does the "Actions" tab set selection tab 212. The "Masterdata" tab 212 may include "Contract data" and "Benefits" icons 214 among others. Here, the user has selected the "Contract Data" tab set icon 214.

The "Contract data" icon 214 is associated with a different set of tabs 216 than does the "Hire" icon 214 shown in FIG. 2, although there may be common tabs, as will be described. In this example, the user has selected a "Personal Data" tab 216 and therefore has access to a "Personal Data" tab panel 218. The "Personal Data" tab panel 218 contains "Personal Data" content 222 which may include text fields, graphics, input fields and combinations thereof.

The system may analyze the data entered by the user to verify its consistency. For example, the system may be capable of determining whether the data entered in a date field constitutes a valid date. As another example, the system may be able to spot inconsistencies between otherwise valid pieces of data, such as when the stated date of marriage for a person precedes the person's birth date of record. The system can display messages relating to input data, such as error messages for inconsistent data. Such messages may be displayed in the user interface 200. It may be convenient to have the message provide a link such that the user can access the entered data, for example by clicking on the link.

In this example, the system determines a possible inconsistency in the data that the user entered under the "Basic Pay" tab 216. The system therefore displays a warning message 224 in the user interface 200. The message 224 alerts the user to the possible inconsistency and provides a link 226 by which the user can gain access to the relevant data. Here, the link 226 is a hyperlink to the "Basic Pay" tab panel 218.

The "Basic Pay" tab 216 may, however, be accessible in several places on the user interface 200. That is, there may be more than one setting of the navigational controls—the tab set selection tabs 212, the tab set icons 214 and the tabs 216—that will cause the "Basic Pay" tab panel 218 to be displayed. In this example, the "Basic Pay" tab 216 also appears in the configuration of the user interface 200 that is shown in FIG. 3. More particularly, the "Basic Pay" tab 216 also is displayed among the tabs 216 when the "Contract data" tab set icon 214 is selected under the "Masterdata" tab set selection tab 212.

There are, therefore, at least two ways for the system to provide the user access to the "Basic Pay" tab panel 218. First, the system may set the navigational controls 212, 214 and 216 to the setting they had in FIG. 2. Second, the system may change the setting of the tabs 216 so that "Basic Pay" is selected instead of "Personal Data". If the user activates the link 226, the system must decide which of the possible paths to the "Basic Pay" tab 216 to use.

The former of these alternatives results in more of the navigation controls (212, 214, 216) being changed from their current setting than does the latter alternative. That is, if the system uses the former path to the "Basic Pay" tab 216 (shown in FIG. 2), there will be changes in the settings of the tab set selection tabs 212, changes in the settings of the tab set icons 214, and changes in the settings of the tabs 216. Such changes may be confusing and disorienting to the user. The latter path, in contrast, requires only a change in the setting of the tabs 216. This allows more of the navigation controls to remain unchanged from the setting they had when the user linked to the "Basic Pay" tab 216.

Figure 4:
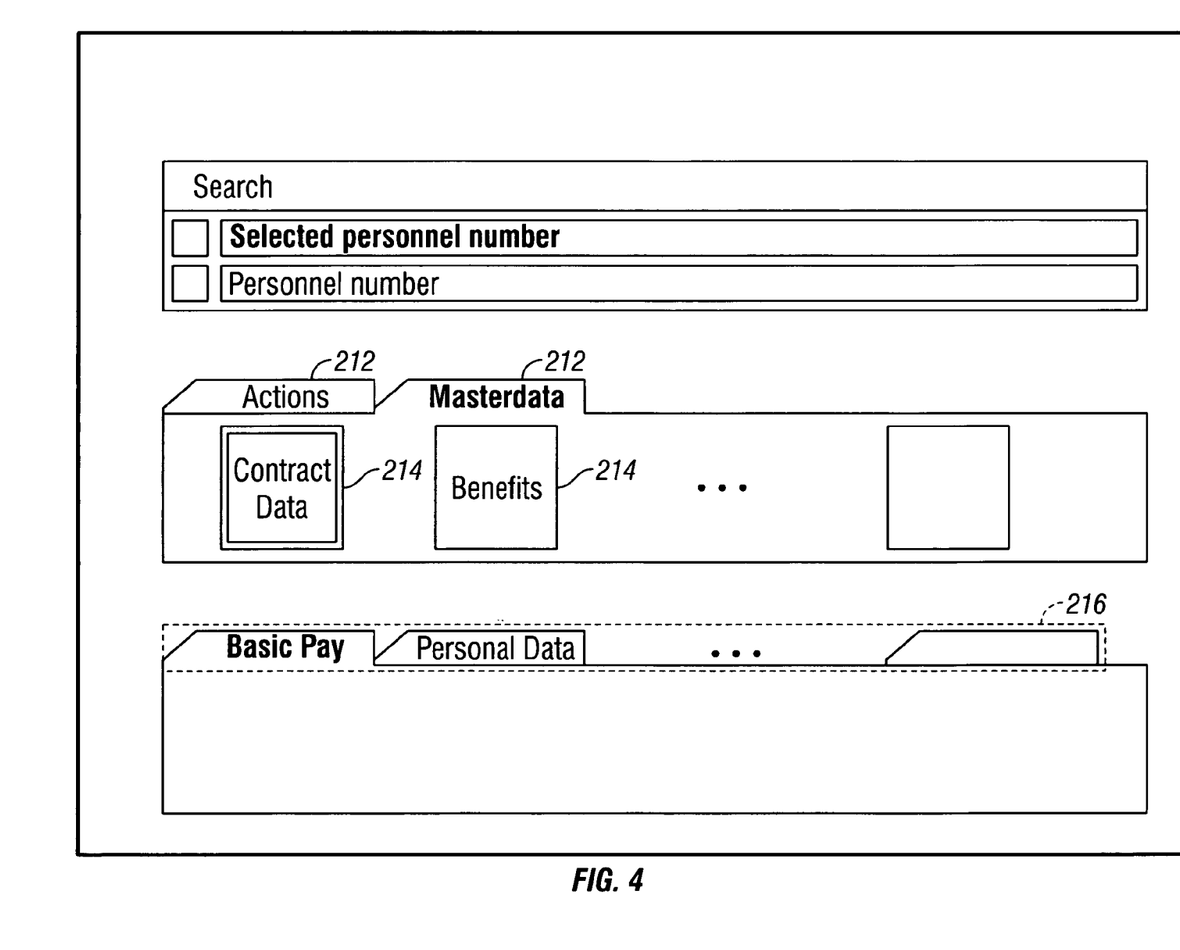

The system therefore selects the latter path for providing the user access to the "Basic Pay" tab 216 and the resulting configuration of the user interface 200 is shown in FIG. 4. The tab set selection tabs 212 have the same setting ("Masterdata") as in FIG. 3. Likewise, the tab set icons 214 have the same setting ("Contact Data") as before. Only the setting of tabs 216 has changed so that "Basic Pay" is now selected.

The exemplary panels above are arranged in a hierarchy. That is, the object selected in the area 202 may be considered the root and the tab panels 218 the leafs, where the tab set selection tabs 212 and the tab set icons 214 form a tree of nodes joining the leafs to the root. Writing out the nodes from root to leaf, the path to the "Personal Data" tab panel as displayed in FIG. 3 becomes:

Current path: Object-Masterdata-Contract Data-Personal Data

Similarly, the two paths that can be taken to reach the "Basic Pay" tab panel are:

Path A: Object-Actions-Hire-Basic Pay

Path B: Object-Masterdata-Contract Data-Basic Pay

Path A has only the root in common with the current path. So if Path A is taken back to the previously entered data, the user interface content relating to the tab panel, tab set icons and tab set selection tabs will change. Path B, in contrast, has the root and the Masterdata and Contract Data nodes in common with the current path. If instead Path B is taken, then only the content of the tab panel will change. Comparing these two alternatives, it is possible that the former will be more distracting and possibly confusing for the user, because there is more change in the user interface content. Accordingly, the path is taken that has a common node with the current path that is nearest the leaf. It will be understood that the particular configuration of the user interface 200 is exemplary only. A similar selection between paths may be done to link back from a current panel to an earlier panel that is not at a common level with the current panel.

Figure 5:
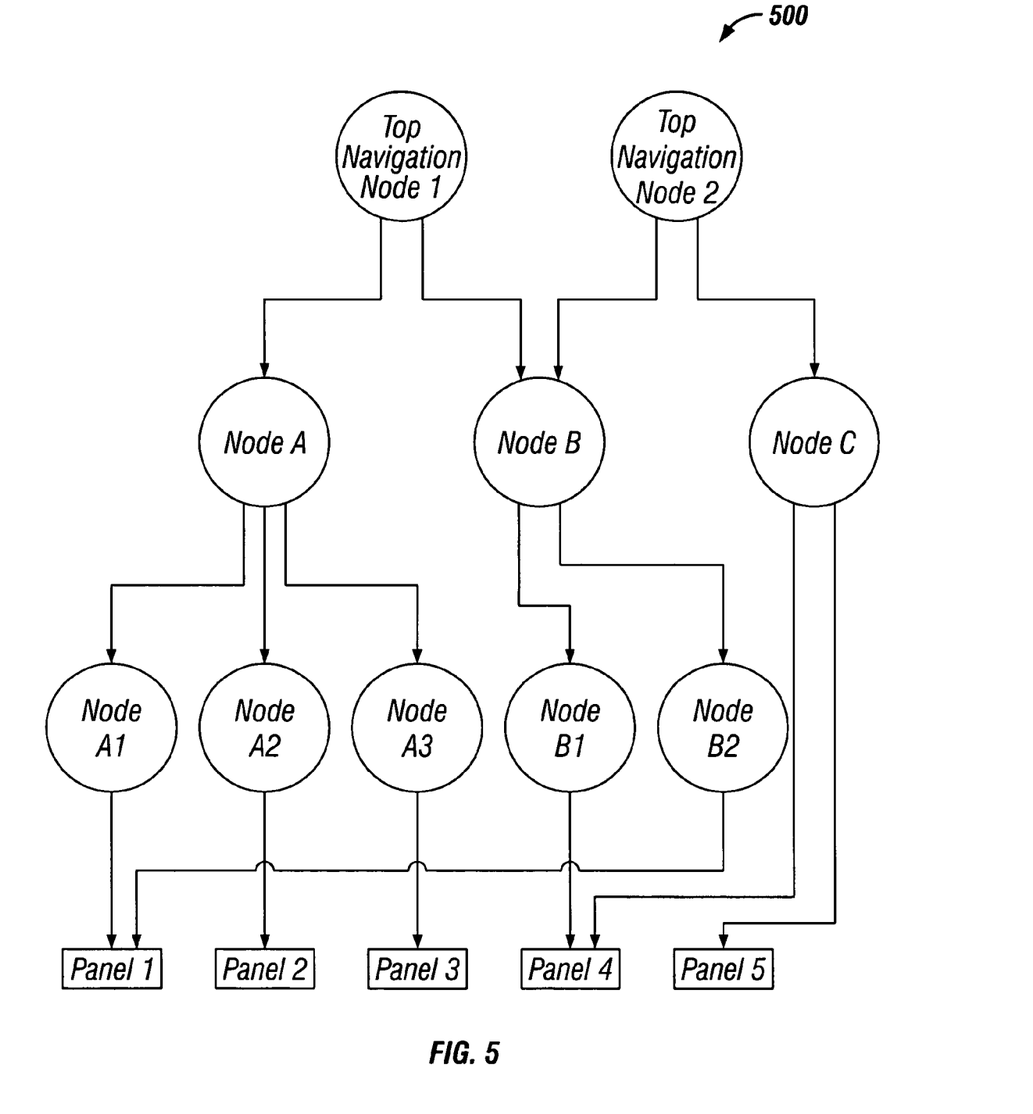
FIG. 5 conceptually shows a non-hierarchical arrangement of panels.

Embodiments of the invention may be used in user interfaces having panel arrangements that are not hierarchies. FIG. 5 contains one such example, where an arrangement of panels and nodes is conceptually illustrated by a directed graph 500. A user may navigate to any of Panels 1-5 in the directed graph 500 using input device(s) 14. When any one of the Panels 1-5 is displayed, it contains panel content reflecting the path that was taken to it. For example, navigation controls accessible to the user may be displayed in the user interface. In this exemplary directed graph 500, there is more than one path for reaching the respective Panels 1 and 4. Accordingly, the appearance of the user interface when either of these panels is displayed depends on the particular paths used in navigating to them.

Assume that a user is currently viewing Panel 4 and a message is displayed that relates to Panel 1. This may be an error message, or a warning message pointing out a possible inconsistency in the data on panel 1. It may be an informational message or a confirmation message regarding the data on Panel 1. Whatever the reason for displaying the message is, it may contain a link for the user to return to the data on Panel 1. If the user activates the link, the system must find a path to Panel 1. As will be described below, it may be possible for the system to determine the proper path without surveying the entire directed graph 500.

In this example, assume that Panel 4 was reached using the path: Top Node 2-Node B-Node B1-Panel 4. The system may proceed by finding the node(s) nearest Panel 1 and determining if they are part of the current path to Panel 4. In this example, Panel 1 can be reached from Node A1 and Node B2. The system will find that none of these nodes is part of the current path to Panel 4. The system may then proceed by evaluating the next level, that is, the nodes from which the just identified nodes can be reached. For Panel 1, this is Node A and Node B. The Node B is part of the current path to Panel 4. The system then chooses to use the path to Panel 1 that includes Node B. This allows the content associated with Node B and above (i.e., those setting of the navigation controls) to remain unchanged.

In contrast, had Panel 4 in this example instead been reached using the path Top Node 2-Node C-Panel 4, then Node B would not have been common with the current path to Panel 4 and the system would not have decided to use that path to Panel 1. Rather, the system would have traced the possible paths to Panel 1 back one more step and determined the nodes from which one could reach the just-identified Node A and Node B. There, the system would have identified Top Node 2 as one of the nodes from which Node B can be reached. Since Top Node 2 occurs in the path taken to Panel 4 in this example, the system would choose a path to Panel 1 that includes this node. This allows the navigation control(s) relating to Top Node 2 to remain unchanged. Selecting a path to Panel 1 that begins with Top Node 1, on the other hand, would not preserve the setting of the navigation control(s) for Top Node 2. Thus, the system chooses a path to the next panel that lets more of the navigation controls remain unchanged.

The above examples involve linking back to a previous panel during the same work session on the computer system 10. This is not the only way that embodiments of the invention can work. Rather, the invention may be used also for returning back to a panel that has not been displayed since the computer system 10 was last shut down and restarted, or since the current application program was closed and again launched. Whenever the user requests access to a panel that can be displayed using two different settings of navigation controls in the user interface, the one setting may be used that allows more of the navigation controls to remain unchanged from their current setting.

Figure 6:
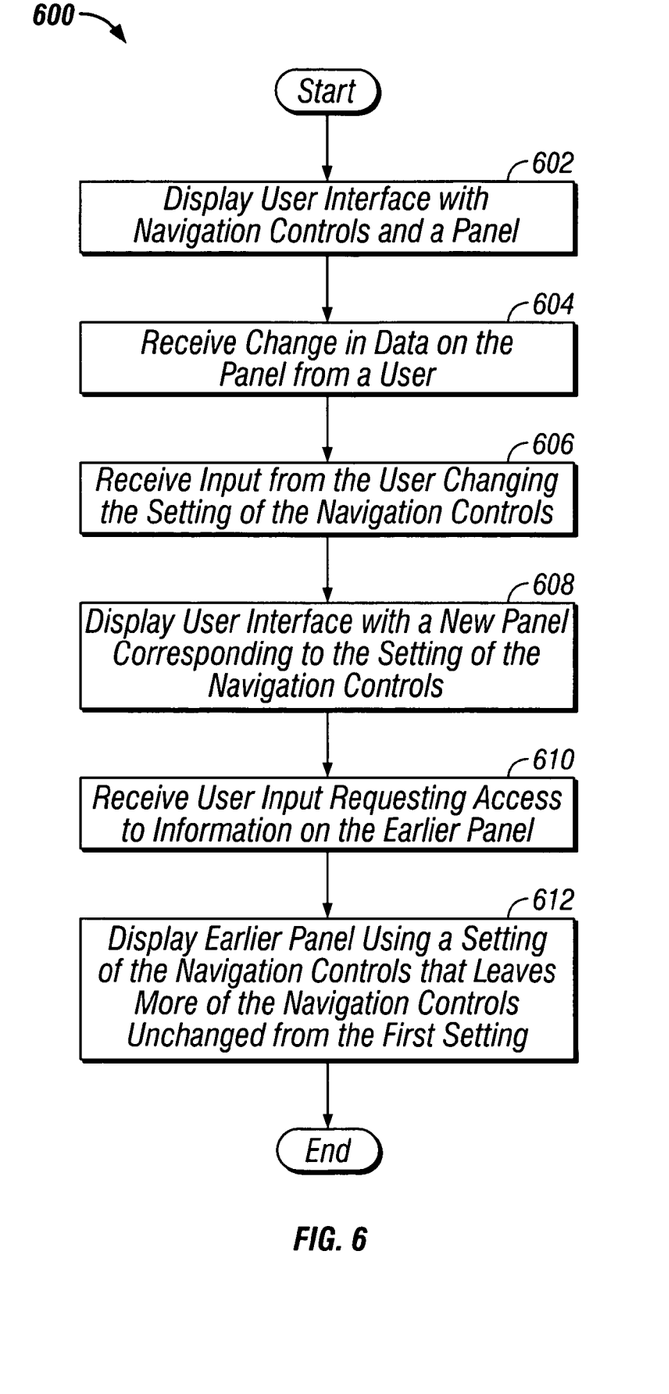
FIG. 6 is a flow chart of a method of successively displaying panels in a user interface.

FIG. 6 is a flow chart of a method 600 of successively displaying panels. The method 600 begins at step 602 with displaying a panel in a user interface having navigation controls. The setting of the navigation controls corresponds to the particular panel being displayed. The panel may have been selected by a user that is navigating through the user interface (i.e., the user may have set the navigation controls). As another example, the panel may be displayed as a default selection, perhaps upon the launch of an application program.

In step 604, the system receives input from the user changing data in the panel. The user may be modifying existing data or the user may be entering data into empty data fields. The user then navigates away from the displayed panel, and the system receives a changed setting of the navigation controls in step 606. In response, the system in step 608 displays the new panel that the user navigated to.

At some point, the system decides to alert the user regarding the data entered on the first panel. This alert may be displayed while the first panel is still being displayed or after the user has navigated to a different panel. The system may display a message that allows the user to link back to the previously entered data. If the user activates the link, the system receives this in step 610 as a request for access to the earlier panel. There may be, as has been described above, more than one path back to the earlier panel; that is, there may be more than one setting of the navigation controls that will cause the earlier panel to be displayed. In step 612, the system displays the earlier panel using a setting of the navigation controls that leaves more of the navigation controls unchanged from the first setting. This provides the user access to the data entered earlier without unnecessarily disrupting the settings of the navigation controls.

Providing successive display of panels may offer advantages compared to other navigation techniques. By choosing one of the alternative paths that lets more of the panel content remain unchanged after linking from one panel to another, there is less chance that the user will be disoriented and make mistakes. Also, there is less need to update panel content, which may help display the new panel quicker.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of successively displaying panels in a computer user interface, the method comprising:
    displaying a first panel of a plurality of panels in a computer user interface, each of the panels including different information and the computer user interface having a plurality of navigation controls by which a user can navigate to any one of the panels to access its information, wherein a first setting of the navigation controls causes the first panel to be displayed;
    receiving a user input requesting access to information on a second panel in the computer user interface, there being at least two different settings of the navigation controls that will cause the second panel to be displayed; and
    ceasing to display the first panel and displaying the second panel using one of the at least two different settings by which more of the navigation controls remain unchanged from the first setting.

2. The method of claim 1, wherein the plurality of panels is arranged in a hierarchy comprising nodes, and wherein the panels are located at a bottom of the hierarchy, and wherein the navigation controls allow the user to navigate by taking different paths in the hierarchy of nodes.

3. The method of claim 2, wherein the first setting of the navigation controls correspond to a first path in the hierarchy of nodes and wherein the at least two settings of the navigation controls for causing display of the second panel correspond to respective at least two paths in the hierarchy of paths, and wherein the one path taken to the second panel is one having a lowest common node with the first path taken to the first panel.

4. The method of claim 2, wherein the first panel and the second panel are at a common level in the hierarchy.

5. The method of claim 2, wherein, the first panel and the second panel are at different levels in the hierarchy.

6. The method of claim 2, wherein the navigation controls comprise tab sets each comprising a plurality of tabs, and tab set selection tabs for selecting between the tab sets, wherein a first tab is capable of triggering display of the first panel and at least a second tab and a third tab are capable of triggering display of the second panel.

7. The method of claim 6, wherein one of the second and third tabs that is part of a common tab set with the first tab is used to display the second panel.

8. The method of claim 1, wherein the user entered the information on the second panel before the first panel was displayed, and wherein displaying the second panel provides the user access to the entered information.

9. The method of claim 8, wherein an analysis of the information entered on the second panel prompted dispatch of a message relating to the entered information, the message containing a link to the second panel, wherein activating the link triggers a determination of which of the at least two settings of the navigation controls to use for displaying the second panel.

10. The method of claim 9, wherein the message is one selected from the group consisting of: an error message, a warning message, an informational message, a confirmation message, and combinations thereof.

11. The method of claim 8, wherein an application program was closed after the information was entered, and wherein the application program includes the first and second panels and is opened before receiving the request to display the second panel, wherein displaying the second panel allows the user access to the information that was entered before the application program was closed.

12. The method of claim 1, wherein the plurality of panels is arranged in a system of nodes that does not form a tree, and wherein the navigation controls allow the user to navigate by taking different paths in the system of nodes.

13. The method of claim 12, wherein the first setting of the navigation controls correspond to a first path in the hierarchy of nodes and wherein the at least two settings of the navigation controls for causing display of the second panel correspond to respective at least two paths in the hierarchy of nodes, and wherein the one of the at least two paths to the second panel is used that has a common node with the first path to the first panel that is nearest the first panel.

14. The method of claim 13, wherein identifying the common node involves beginning with those of the nodes that are nearest the second panel in the system of nodes, and determining whether any of these nodes are common with any node in the first path.

15. A computer program product stored in a machine-readable storage device and containing executable instructions that when executed cause a processor to:
    display a first panel of a plurality of panels in a computer user interface, each of the panels including different information and the computer user interface having a plurality of navigation controls by which a user can navigate to any one of the panels to access its information, wherein a first setting of the navigation controls causes the first panel to be displayed;
    receive a user input requesting access to information on a second panel in the computer user interface, there being at least two different settings of the navigation controls that will cause the second panel to be displayed; and
    cease to display the first panel and display the second panel using one of the at least two different settings by which more of the navigation controls remain unchanged from the first setting.

16. The computer program product of claim 15, wherein the plurality of panels is arranged in a hierarchy comprising nodes, and wherein the panels are located at a bottom of the hierarchy, and wherein the navigation controls allow the user to navigate by taking different paths in the hierarchy of nodes wherein the first setting of the navigation controls correspond to a first path in the hierarchy of nodes and wherein the at least two settings of the navigation controls for causing display of the second panel correspond to respective at least two paths in the hierarchy of paths, further comprising instructions that when executed cause the processor to:

display the second panel using the one of the at least two paths that has a lowest common node with the first path taken to the first panel.

17. The computer program product of claim 15, further comprising instructions that when executed cause the processor to:

dispatch a message relating to information entered by the user on the second panel, the message containing a link to the second panel that when activated triggers a determination of which of the at least two settings of the navigation controls to use for displaying the second panel.

18. The computer program product of claim 15, wherein the panels are arranged in a system of nodes that does not form a tree, and wherein the navigation controls allow the use to navigate by taking different paths in the system of node's, further comprising instructions that when executed cause the processor to:

begin with nodes nearest the second panel and determine whether any of these nodes are common with any node in a path by which the first panel was reached.

* * * * *